(12) United States Patent
Liu et al.

(10) Patent No.: US 11,009,923 B2
(45) Date of Patent: May 18, 2021

(54) MAINBOARD FIXING DEVICE, DISPLAY MODULE AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Fangyi Liu, Beijing (CN); Xiaoping Zhang, Beijing (CN); Xin Wang, Beijing (CN); Yangli Zheng, Beijing (CN); Jianguo Zhu, Beijing (CN); Futeng Li, Beijing (CN); Jianru Yang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 390 days.

(21) Appl. No.: 16/097,614

(22) PCT Filed: Mar. 29, 2018

(86) PCT No.: PCT/CN2018/081056
§ 371 (c)(1),
(2) Date: Oct. 29, 2018

(87) PCT Pub. No.: WO2018/223754
PCT Pub. Date: Dec. 13, 2018

(65) Prior Publication Data
US 2021/0116977 A1    Apr. 22, 2021

(30) Foreign Application Priority Data
Jun. 7, 2017 (CN) .......................... 201710423328.8

(51) Int. Cl.
*G06F 1/16* (2006.01)
*G06F 1/18* (2006.01)

(52) U.S. Cl.
CPC .................................. *G06F 1/184* (2013.01)

(58) Field of Classification Search
CPC ...... H05K 7/12; H05K 7/1402; H05K 7/1417; H05K 7/1429; H05K 2201/10;
(Continued)

(56) References Cited

U.S. PATENT DOCUMENTS 3,066,367 A * 12/1962 Garman ................. H02B 1/015
                                                    248/222.11
7,539,021 B2 * 5/2009 Peng ......................... H05K 9/00
                                                        361/752
(Continued)

FOREIGN PATENT DOCUMENTS

| CN | 101126852 A | 2/2008 |
| CN | 103148413 A | 6/2013 |

(Continued)

OTHER PUBLICATIONS

International Search Report and Written Opinion dated Jun. 11, 2018, from application No. PCT/CN2018/081056.

*Primary Examiner* — Anthony Q Edwards
(74) *Attorney, Agent, or Firm* — Arch & Lake LLP

(57) ABSTRACT

A mainboard fixing device, a display module and a display device are provided. The mainboard fixing device includes a printed circuit board (PCB) mainboard, a first elastic member and a second elastic member. The first elastic member and the second elastic member are disposed at a first side and a second side of the PCB mainboard, respectively. The first side and the second side are symmetric with each other.

8 Claims, 3 Drawing Sheets

(58) Field of Classification Search
CPC . H05K 2201/10265; H05K 2201/1034; H05K 2201/10424; G06F 1/1626; G06F 1/1633; G06F 1/184
See application file for complete search history.

(56) References Cited

U.S. PATENT DOCUMENTS

| | | | |
|---|---|---|---|
| 9,964,691 B2* | 5/2018 | Sun | G02B 6/0088 |
| 2007/0103632 A1 | 5/2007 | Chen et al. | |
| 2010/0195304 A1* | 8/2010 | Takao | G06F 1/1616 |
| | | | 361/804 |
| 2012/0236512 A1* | 9/2012 | Liu | H05K 7/1417 |
| | | | 361/748 |
| 2012/0300397 A1* | 11/2012 | Yang | G06F 1/184 |
| | | | 361/679.58 |
| 2014/0165378 A1* | 6/2014 | Mann | H05K 7/12 |
| | | | 29/592.1 |
| 2017/0164487 A1* | 6/2017 | Kim | H05K 7/1427 |
| 2017/0212571 A1* | 7/2017 | Yang | G06F 1/1626 |
| 2019/0191573 A1* | 6/2019 | Araki | H05K 5/0069 |

FOREIGN PATENT DOCUMENTS

| | | |
|---|---|---|
| CN | 106990575 A | 7/2017 |
| WO | WO-2014/124572 A1 | 8/2014 |

* cited by examiner

MAINBOARD FIXING DEVICE, DISPLAY MODULE AND DISPLAY DEVICE

CROSS-REFERENCE

The present disclosure is based on International Application No. PCT/CN2018/081056, filed on Mar. 29, 2018, which is based upon and claims priority of Chinese Patent Application No. 201710423328.8 filed on Jun. 7, 2017, the disclosure of which is incorporated herein by reference in its entirety as part of the present application.

TECHNICAL FIELD

The present disclosure relates to the field of display technology, and particularly to a mainboard fixing device, a display module and a display device.

BACKGROUND

At present, liquid crystal display (LCD) device has occupied the dominant position and become necessary equipment in people's daily works and lives. Due to its high utilization, people also have stricter requirements on the LCD device, not only seeking for intelligentizing but also for ultra-thinning, so that it can be more convenient for living needs.

As is well-known, LCD module is a component which is disposed inside the LCD device and used for cooperating with respective functions of the LCD device. An existing LCD module includes a LC screen, a backlight source, a printed circuit board (PCB) mainboard and the like; the PCB mainboard is provided with electronic elements, wirings, and interfaces connected with a device mainboard.

The existing LCD module is fixed by bonding the PCB mainboard inside a housing (or a backlight backplane). During an assembling process of the LCD module, or when a certain component in the LCD module is damaged and needs to be replaced, it has to detach the PCB mainboard from the housing or the backlight backplane for repair. Because the existing fixing is achieved by way of bonding, the detaching process will be extremely troublesome, an adhesive residue may be left and the PCB mainboard may not be completely removed, which causes damage to the PCB mainboard or waste of material.

Therefore, the technical solution of related technology still has room for improvement.

It should be explained that, information disclosed in the BACKGROUND part above is merely used to enhance the understanding of the background of the present disclosure, and hence may include information which doesn't constitute the related technology well-known for those skilled in the art.

SUMMARY

According to one aspect of the present disclosure, it provides a mainboard fixing device. The mainboard fixing device includes a printed circuit board (PCB) mainboard, a first elastic member and a second elastic member. The first elastic member and the second elastic member are disposed at a first side and a second side of the PCB mainboard, respectively. The first side and the second side are symmetric with each other.

In an exemplary arrangement of the present disclosure, the device further includes a third elastic member and a fourth elastic member. The third elastic member and the fourth elastic member are disposed at a third side and a fourth side of the PCB mainboard, respectively. The third side and the fourth side are symmetric with each other.

In an exemplary arrangement of the present disclosure, the first elastic member, the second elastic member, the third elastic member and the fourth elastic member are fixed on the PCB mainboard by way of bonding, respectively.

In an exemplary arrangement of the present disclosure, the first elastic member, the second elastic member, the third elastic member and the fourth elastic member include any one of a rubber member, a colloidal silica member and a spring.

In an exemplary arrangement of the present disclosure, an external side of each of the first elastic member, the second elastic member, the third elastic member and the fourth elastic member further includes a head plate.

In an exemplary arrangement of the present disclosure, the head plate is bonded onto the external side of each of the first elastic member, the second elastic member, the third elastic member and the fourth elastic member.

According to another aspect of the present disclosure, it provides a display module including the mainboard fixing device described in any of the foregoing arrangements.

According to yet another aspect of the present disclosure, it provides a display device including the above-mentioned display module.

In an exemplary arrangement of the present disclosure, the display device further includes at least one of a housing and a backlight backplane; positions on the housing or the backlight backplane corresponding to the first elastic member and the second elastic member, respectively, include a first buckle slot and a second buckle slot.

In an exemplary arrangement of the present disclosure, the first buckle slot and the second buckle slot are made by adopting a material as same as that of the housing or the backlight backplane.

BRIEF DESCRIPTION OF THE DRAWINGS

The drawings here incorporated into the description as a part of the description illustrate arrangements in accordance with the present disclosure and are used to explain the principle of the present disclosure in connection with the description. Obviously, the described drawings below are merely related to some of the arrangements of the present disclosure. For those ordinary skilled in the art, other drawings may be obtained according to these drawings without any creative labor.

DETAILED DESCRIPTION

Figure 1:
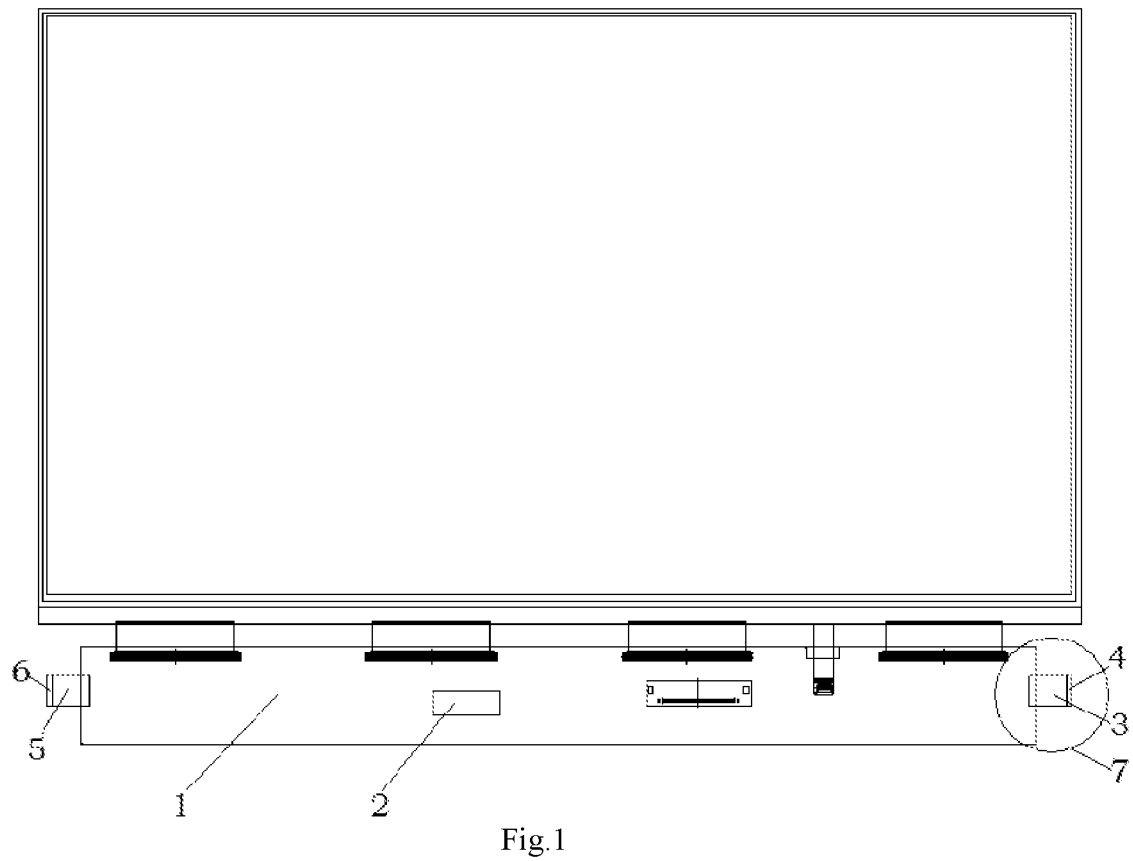
FIG. 1 illustrates a structural front view of a display module in an exemplary arrangement of the present disclosure.

Hereinafter, exemplary arrangements of the present disclosure will be described in a more complete way with reference to the drawings. However, the exemplary arrangements of the present disclosure may be implemented in various ways, and should not be interpreted as being limited to the exemplary arrangements herein; the described feature(s), structure(s) or characteristic(s) may be combined in one or more arrangement in any appropriate way. In the description below, plenty of details will be provided so that the arrangements of the present disclosure are fully understandable. However, those skilled in the art will be appreciated that, technical solution(s) of the present disclosure may be implemented without one or more of these specific details, or other method(s), element(s), device(s), step(s) and the like may be adopted.

It should be pointed out that, dimension(s) of layer(s) and area(s) in the drawings may be exaggerated for clarity of illustration. Moreover, it should be understood that, when an element or layer is referred to as being "on" another element or layer, it may be directly on another element, or an intermediate layer may be present. Additionally, it should be understood that, when an element or layer is referred to as being "below" another element or layer, it may be directly below another element, or more than one intermediate layer may be present. Additionally, it should also be understood that, when an element or layer is referred to as being "between" two elements or layers, it may be the one and only layer between the two elements or layers, or more than one intermediate layer or element may be present. Throughout the disclosure, similar reference marks indicate similar elements.

The fixing method of the LCD module in the related technology is to bond the PCB mainboard inside the housing or backlight backplane. However, it has been found in use that, due to the fixing method of bonding, the detaching process of the PCB mainboard will be extremely troublesome, an adhesive residue may be left, and the PCB mainboard may not be completely removed, which causes damage to the PCB mainboard or waste of material.

The implementation of the present disclosure, first of all, provides a mainboard fixing device, the mainboard fixing device includes a PCB mainboard, a first elastic member and a second elastic member. The first elastic member and the second elastic member can be disposed at a first side and a second side of the PCB mainboard, respectively; and the first side and the second side are symmetric with each other.

In an exemplary arrangement, the device can further include a third elastic member and a fourth elastic member. The third elastic member and the fourth elastic member can be respectively disposed at a third side and a fourth side of the PCB mainboard, and the third and fourth sides are symmetric with each other.

In an arrangement of the present disclosure, by arranging a detachable or an easily detachable elastic member in four directions (e.g., front side, rear side, left side and right side) of the PCB mainboard, a freedom degree of the PCB mainboard is restricted, so as to achieve fixing the PCB mainboard inside the housing or the backlight backplane; such structure that allows to detach the PCB mainboard from the housing or the backlight backplane can solve a series of connecting problem(s) caused by fixing the PCB mainboard by way of bonding in the related technology. At the same time, such structure achieves quickly detaching the PCB mainboard without increasing a thickness of the display module, and prevents from damage to the PCB mainboard and waste of material.

In an exemplary arrangement, the first elastic member, the second elastic member, the third elastic member and the fourth elastic member are fixed on the PCB mainboard by way of bonding, respectively.

In an exemplary arrangement, the first elastic member, the second elastic member, the third elastic member and the fourth elastic member can include any one of a rubber member, a colloidal silicon member and a spring, without particularly limited in the present disclosure.

In an exemplary arrangement, an external side of each of the the first elastic member, the second elastic member, the third elastic member and the fourth elastic member can further include a head plate.

In an exemplary arrangement, the head plate can be bonded onto the external side of each of the first elastic member, the second elastic member, the third elastic member and the fourth elastic member.

The implementation of the present disclosure further provides a display module, and the display module includes the mainboard fixing device in the arrangements above. Hereinafter, the structure of the mainboard fixing device and the display module will be described with reference to FIGS. 1-4 by way of example.

FIG. 1 illustrates a structural front view of a display module in an exemplary arrangement of the present disclosure.

In the arrangement of the present disclosure, description will be given with reference to the case where the display module is a LCD module by way of example. However, the present disclosure is not limited thereto.

As illustrated in FIG. 1, the arrangement of the present disclosure provides a first elastic member 5 and a second elastic member 6 at a left side and a right side of the PCB mainboard 1, respectively, for fixing a freedom degree of the left side and right side of the PCB mainboard 1.

Still referring to the arrangement of FIG. 1, it can further provide a third elastic member 2 and a fourth elastic member (not illustrated) at a front side and a rear side of the PCB mainboard 1, respectively, for fixing a freedom degree of the front side and rear side of the PCB mainboard 1. By providing four elastic members at four sides of the PCB mainboard, respectively, it can achieve fixing the PCB mainboard from four directions.

In an exemplary arrangement, the first elastic member 5, the second elastic member 3, the third elastic member 2 and the fourth elastic member all can be fixed on the PCB mainboard 1 by way of bonding. However, the way of fixing the first elastic member 5, the second elastic member 3, the third elastic member 2 and the fourth elastic member on the PCB mainboard 1 is not particularly limited in the present disclosure.

In an exemplary arrangement, the first elastic member 5, the second elastic member 3, the third elastic member 2 and the fourth elastic member each can be a connecting member with elasticity, such as a rubber block and a spring. The elastic member can be a rubber member, a colloidal silica member, a spring and the like, and a shape of the elastic member is not limited to the external contour illustrated in the drawings but can be any shape which can achieve the fixing function.

Still referring to the arrangement of FIG. 1, an external side of each of the first elastic member 5, the second elastic member 3, the third elastic member 2 and the fourth elastic member can be bonded with a head plate 6, 4 (head plates at the front side and the rear side are not illustrated) so as to compress the elastic members in a better way and meanwhile reinforcing the fixing effect.

The display module provided by the implementation of the present disclosure restricts the freedom degree of the PCB mainboard by providing detachable or easily detachable elastic members in four directions of the PCB mainboard, so as to achieve fixing the PCB mainboard inside the housing or the backlight backplane of the display module; such structure that allows to detach the PCB mainboard from the housing can solve problem(s) caused by fixing the PCB mainboard by way of bonding, such as a damage to the PCB mainboard and a waste of material.

Figure 2:
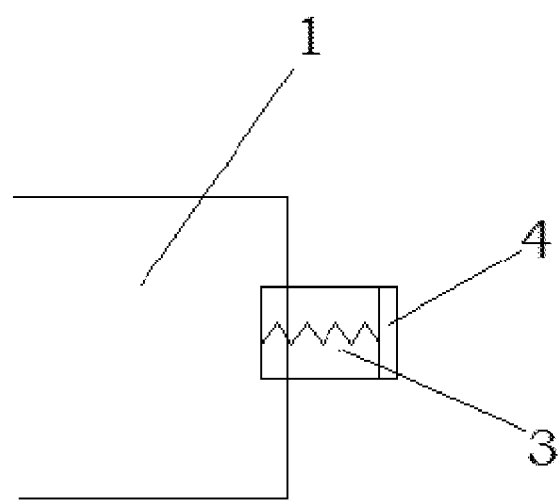
FIG. 2 illustrates a schematic diagram of an elastic member being not compressed on a PCB mainboard in an exemplary arrangement of the present disclosure.

FIG. 2 illustrates a schematic diagram of an elastic member being not compressed on a PCB mainboard in an exemplary arrangement of the present disclosure.

As illustrated in FIG. 2, it should be explained that, although only the second elastic member 3 at the right side of the PCB mainboard 1 and the head plate 4 on the external side of the second elastic member 3 are illustrated by way of example, this figure is merely used for reflecting an initial state of the structure of the elastic member, and the initial state of other three elastic members and of the head plates can also refer to FIG. 2.

Figure 3:
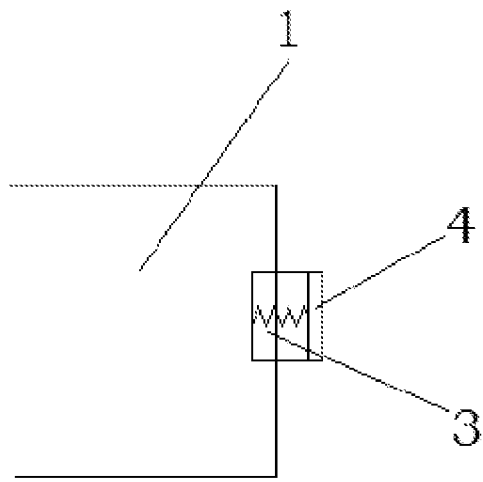
FIG. 3 illustrates a schematic diagram of an elastic member being compressed on a PCB mainboard in an exemplary arrangement of the present disclosure.

FIG. 3 illustrates a schematic diagram of an elastic member being compressed on a PCB mainboard in an exemplary arrangement of the present disclosure.

As illustrated in FIG. 3, description is still given with reference to the second elastic member 3 at the right side of the PCB mainboard 1 and the head plate 4 on the external side of the second elastic member 3 by way of example, but this figure is merely used for reflecting a compressed state of the structure of the elastic member, and the compressed state of the other three elastic members and of the head plate can also refer to FIG. 3.

The implementation of the present disclosure further provides a display device, and the display device includes the display module described in the arrangements above.

In an exemplary arrangement, the display device can further include a housing and/or a backlight backplane; positions on the housing or the backlight backplane corresponding to the first elastic member and the second elastic member respectively can include a first buckle slot and a second buckle slot.

In an exemplary arrangement, the first buckle slot and the second buckle slot can be made by adopting a material as same as that of the housing or the backlight backplane. However, the present disclosure is not limited thereto.

In an exemplary arrangement, when the mainboard fixing device further includes a third elastic member and a fourth elastic member, the third elastic member and the fourth elastic member can be disposed at a third side and a fourth side of the PCB mainboard, respectively, and the third side and the fourth side are symmetric with each other. In such case, positions on the housing or the backlight backplane corresponding to the third elastic member and the fourth elastic member respectively can include a third buckle slot and a fourth buckle slot.

In an exemplary arrangement, the first through fourth buckle slot can be made by adopting a material as same as that of the housing or the backlight backplane. However, the present disclosure is not limited thereto.

In the mainboard fixing device of some arrangements of the present disclosure, by respectively providing the first elastic member and the second elastic member at symmetric two sides of the PCB mainboard, on one hand, it can fix the PCB mainboard in a better way; and on the other hand, it allows the PCB mainboard to be easily detachable without any residual adhesive when it needs to detach the PCB mainboard so that the PCB mainboard may not be damaged, thus saving the material and reducing the cost.

Figure 4:
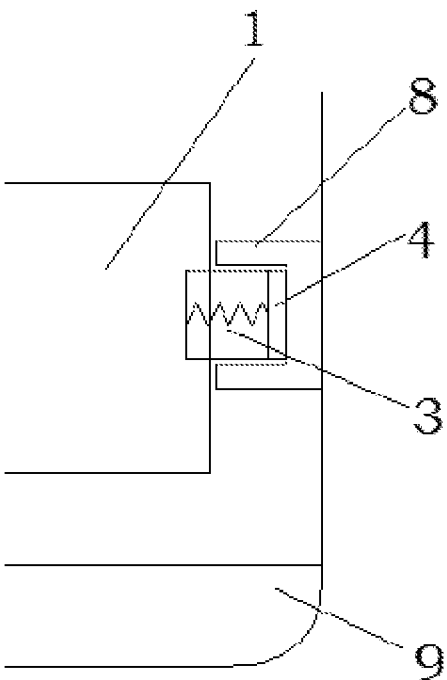
FIG. 4 illustrates a schematic diagram of an elastic member being stuck in a buckle slot upon releasing a compression amount on a PCB mainboard in an exemplary arrangement of the present disclosure.

FIG. 4 illustrates a schematic diagram of an elastic member being stuck in a buckle slot upon releasing a compression amount on a PCB mainboard in an exemplary arrangement of the present disclosure.

In an exemplary arrangement of the present disclosure, positions on the housing corresponding to the first elastic member 5, the second elastic member 3, the third elastic member 2 and the fourth elastic member (not illustrated) respectively can be formed with a buckle slot so that the elastic member can be stuck in the slot in a compressed state and can release a certain compression amount in the slot to lock the PCB mainboard 1. The buckle slot can adopt a material as same as that of the housing or the backlight backplane without increasing additional material.

As illustrated in FIG. 4, the display device includes a housing 9, and a position on the housing 9 corresponding to the second elastic member 3 is provided with a buckle slot 8.

It should be explained that, FIG. 4 merely illustrates the second elastic member and the corresponding buckle slot, the other three elastic members and the corresponding buckle slots can refer to FIG. 4.

The implementation of the present disclosure achieves fixing the PCB mainboard by providing elastic members at front and rear side and/or left and right side of the PCB mainboard, and by forming a buckle slot in positions on the housing corresponding to the elastic members, so as to facilitate detaching the PCB mainboard, which solves the problem that the PCB mainboard fixed by way of bonding is difficult to be detached. At the same time, such structure will not increase the thickness of the module and is convenient for the PCB mainboard to be detached, thus preventing from damage to the PCB mainboard and waste of material.

Additionally, in other exemplary arrangements of the present disclosure, the display module can further include other component(s). Therefore, technical solution(s) with additional structure(s) also fall(s) within the protection scope of the present disclosure.

Figure 5:
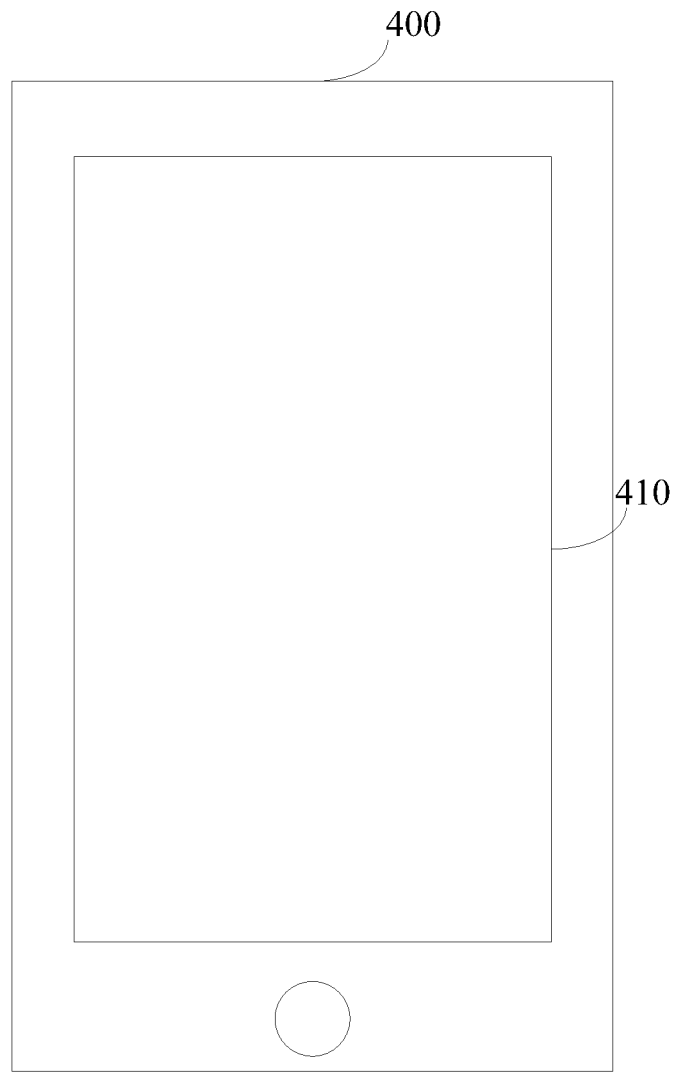
FIG. 5 illustrates a schematic diagram of a display device in an exemplary arrangement of the present disclosure.

FIG. 5 illustrates a schematic diagram of a display device in an exemplary arrangement of the present disclosure.

By way of example, as illustrated in FIG. 5, the implementation of the present disclosure further provides a display device 400, including the display module described in the arrangements above.

The display device 400 can be any product or component with display function such as display panel, mobile phone, tablet computer, television, notebook computer, digital photo frame and navigator.

Referring to FIG. 5, the display device 400 can further include a display panel 410. The display panel 410 can be a flat display panel, such as a plasma panel, an organic light-emitting diode (OLED) panel, and a thin film transistor liquid crystal display (TFTLCD) panel.

In an exemplary arrangement, the display device 400 can be a LCD device, including an array substrate and a color filter (CF) substrate disposed opposite to the array substrate. The array substrate can be a TFT-LCD array substrate. During the implementation process, the CF substrate can also be replaced by a transparent substrate on which a color filter is disposed.

The display device can also be a box-shaped OLED display device including an opposed substrate disposed opposite to the above-mentioned array substrate, and an organic light-emitting material layer disposed between the array substrate and the opposed substrate.

The display device provided by the present disclosure includes the above-mentioned display module, and hence can solve the same technical problem and achieve the same technical effect, without repeating herein separately.

By considering the specification and practicing the disclosure disclosed herein, other implementing mode(s) may be easily conceivable for those skilled in the art. The present disclosure is intended to cover any variation, purpose or adaptive modification of the present disclosure which is in accordance with the generic principle of the present disclosure and to include common knowledge or conventional technical measures in the technical field to which the present disclosure pertains. The specification and the arrangement(s) are merely deemed as exemplary, and the true scope and spirit of the present disclosure are indicated by the appended claims.

What is claimed is:

1. A mainboard fixing device for a printed circuit board (PCB) mainboard, comprising: a first elastic member; a second elastic member, a third elastic member, and a fourth elastic member, the first elastic member and the second elastic member being disposed at a first side and a second side of the PCB mainboard, respectively, and the third elastic member and the fourth elastic member being disposed at a third side and a fourth side of the PCB mainboard, respectively,
wherein the first side and the second side are symmetric with each other, the third side and the fourth side are symmetric with each other, and the first elastic member, the second elastic member, the third elastic member and the fourth elastic member are fixed on the PCB mainboard by way of bonding.

2. The mainboard fixing device according to claim 1, wherein the first elastic member, the second elastic member, the third elastic member and the fourth elastic member comprise any one of a rubber member, a colloidal silica member and a spring.

3. The mainboard fixing device according to claim 1, wherein an external side of each of the first elastic member, the second elastic member, the third elastic member and the fourth elastic member further comprises a head plate.

4. The mainboard fixing device according to claim 3, wherein the head plate is bonded onto the external side of each of the first elastic member, the second elastic member, the third elastic member and the fourth elastic member.

5. A display module, comprising the mainboard fixing device according to claim 1.

6. A display device, comprising the display module according to claim 5.

7. The display device according to claim 6, further comprising at least one of a housing and a backlight backplane, wherein
positions on the housing or the backlight backplane corresponding to the first elastic member and the second elastic member, respectively, comprise a first buckle slot and a second buckle slot.

8. The display device according to claim 7, wherein the first buckle slot and the second buckle slot are made of a material as same as that of the housing or the backlight backplane.

* * * * *